United States Patent [19]

Ristenbatt

[11] 3,824,469

[45] July 16, 1974

[54] COMPREHENSIVE AUTOMATIC VEHICLE COMMUNICATION, PAGING, AND POSITION LOCATION SYSTEM

[76] Inventor: Marlin Philip Ristenbatt, 3606 Terhune Rd., Ann Arbor, Mich. 48104

[22] Filed: June 16, 1972

[21] Appl. No.: 263,704

[52] U.S. Cl. ........................ 325/39, 325/53, 343/228

[51] Int. Cl. ................................................ H04b 3/60

[58] Field of Search ............. 325/48, 53, 54, 55, 64, 325/39, 141–143; 179/15 BZ, 41 A; 340/32, 33, 176 A, 176 B, 167 A; 343/228, 225

[56] References Cited

UNITED STATES PATENTS

| | | | |
|---|---|---|---|
| 3,341,660 | 9/1967 | Duerdoth | 179/15 BY |
| 3,582,787 | 6/1971 | Muller et al. | 325/53 |
| 3,588,371 | 6/1971 | Monte | 325/55 |
| 3,638,179 | 1/1972 | Coll et al. | 340/32 |
| 3,646,274 | 2/1972 | Nadir et al. | 179/15 BY X |
| 3,646,580 | 2/1972 | Fuller et al. | 325/53 |
| 3,714,575 | 1/1973 | Rogalski | 325/53 |

*Primary Examiner*—Benedict V. Safourek
*Assistant Examiner*—Aristotelis M. Pistos
*Attorney, Agent, or Firm*—Barnes, Kisselle, Raisch & Choate

[57] ABSTRACT

A comprehensive electronic communication system for vehicles to permit transmission and reception of signals with respect to traffic warnings, crash warnings, emergency location signals, assistance signals, danger signals, and traffic advisories and the like, including a transmitter for repetitive transmitting on a single carrier frequency of a digital codeword and a receiver which provides controllable decoding and automatic receiver tuning means for automatically tuning a receiver to a predetermined local channel.

18 Claims, 10 Drawing Figures

COMPREHENSIVE AUTOMATIC VEHICLE COMMUNICATION, PAGING, AND POSITION LOCATION SYSTEM

STATEMENT OF INVENTION

This invention relates to a comprehensive electronic communication system to permit automatic vehicle reception (and transmission) of selectable digital and analog messages from a full range of messages and affords vehicle position information. Although the system is applicable to any situation where vehicles move throughout a region, including automatic and non-automatic transportation systems, the description herein will use the personal vehicle as the primary illustration. The system is open-ended, and provides a sensible consistent solution for all vehicle communication and position location objectives. Building one comprehensive system greatly improves the cost-effectiveness compared to building many different specialized systems.

It is an object of the present invention to provide a system in which a full range of optional and non-optional messages are (each) repetitively transmitted from either roadside transmitters or other vehicles to passing vehicles. The passing vehicle will automatically receive one cycle of any non-optional (urgent) message or an operator-chosen message. The message may be either a single M-ary digital message or an extended digital or analog message, and may involve a transmitted response. Most desired communication between the vehicle and the environment is handled in this "common-function" manner. Some dedicated functions, possibly requiring a separate channel and dedicated components, are also included. Vehicle-initiated transmissions are permitted in emergency conditions and for automatic vehicle-control purposes.

It is a further object to provide the use of special signalling codewords which simultaneously address each separate communication function and provide an M-ary digital message modulation. The digital modulation either completes the communication or frequency-commands the vehicle transceiver for extended messages. This command-tuning minimizes the required nation-wide channels, and permits maximum adjustment to local conditions for extended communication.

It is a still further object to provide a system which can utilize present vehicle AM radios which can be expanded to include command-reception, electronic tuning, and a transmission capability. The vehicle-environment link may be either closed-circuit, using buried cable or roadway antennas with vehicle downward-looking antennas, or range-limited broadcast mode. In either case any local command-tuning is tailored to the particular local channel-availability conditions.

Another object is to make available vehicle position information by measuring the time interval between an interrogation transmission of a codeword, and the subsequent reception of a responded codeword. This is used in a vehicle for vehicle-spacing, and is used by two cooperating roadside receivers for position-location of the vehicle.

THE PROBLEM

The safety, efficiency, and pleasure of both personal and mass transit vehicles that range over a large region can be substantially increased by providing a range of information to the vehicle via radio communication, and permitting the vehicle to communicate to the evironment.

The ways in which the safety, efficiency, and pleasure of vehicle use can be increased is quite large. For the highway motorist, some desired communication and location functions, listed in estimated order of urgency, are:

1. Traffic Warnings: Warnings of dangerous conditions (bridges iced, fog, etc.) can be broadcast to all motorists in an area.

2. Crash Warning: An immediate warning can be given to all vehicles near a victim vehicle that has encountered an emergency (spin-out, roll over or crash stop).

3. Emergency Homing Signal: A crashed vehicle can transmit a signal which permits emergency aid vehicles to be alerted, to position fix, and possibly to actively home on the victim vehicle.

4. Motorist Aid: A stranded motorist can request specific motorist aid from the specific source of help over any area covered by receiving stations. The vehicle position-fixing may be automatic using two or more roadside transceiver sites or a continuously instrumented roadway, or may be vehicle-operator-assisted.

5. Wrong-Way Entrance Prevention: Vehicles entering a roadway the "wrong way" can be halted by disabling the ignition or slowing to idle.

6. Specific Traffic Advisories: The traffic flow can be speeded by locally informing approaching motorists of traffic congestion and suggesting alternate routes.

7. Internal Sirens: Motorists in air-conditioned cars with closed windows may not hear emergency vehicle sirens. The siren message can be positively played from the vehicle radio, using a unique buzzer.

8. Traffic Signal Control: Signal transmissions between vehicles and automatic traffic signal controllers can improve and optimize the use of the roadways and intersections, and permit emergency vehicles to command a series of green lights.

9. Law Enforcement: Runaway vehicles can be halted by a police car, and car theft can be reduced by having a more convenient (computerized) automatic interrogation of cars for comparison with a stolen car list. Also, vehicle tampering can be communicated to a central office by connecting the system here to available vehicle-alarm systems. Speed limit can be commanded from the roadway.

10. Vehicle Spacing Control: Responded transmissions between following vehicles can be used to measure vehicle spacing. This can be used for future automatic vehicle control systems, or to replace the present speed control (motorist) assist with spacing-control-assist.

11. Route Guidance Assist: Route guidance assistance can be provided by alerting the motorist that he is approaching a previously designated route at which he wishes to make a route switch.

12. Services Available: The services available (food, lodging, repair, medical) can be described via the vehicle radio at major intersections.

13. Automatic Tolling: Automatic tolling at toll roads and bridges can be done without vehicle stopping, using the automatic vehicle identification feature.

14. Taped Travelogues: Taped travelogues, carried by the vehicle, can be keyed from roadside transmitters to provide the motorist with an informative description of the area through which he is passing.

15. Vehicle Paging: The roadside transmitters can page the passing vehicle, if the transmitters are given the unique vehicle identification digital word.

16. Automated Highway Communication: The vehicle communication system invented here can be used to link the vehicle with any upcoming automatic vehicle control systems and methods.

In summary, the overall object of the present invention here is to satisfy a long felt need for a comprehensive motorist communication system which can provide for all vehicle communication functions. If each function were to require a separate communication system, the cost would be prohibitive and sufficient frequencies would not be available. The comprehensive communication system here accommodates the entire range of desired functions in a cost effective way and requires only a few nationwide channel allocations.

Other objects and features of the invention will be apparent in the following description and claims together with the drawings in which the best mode presently contemplated for practice of the invention is set forth.

HISTORY OF THE PROBLEM

Most of the previous vehicle communication systems have been specialized, addressing one or a subset of the above-named functions. One general approach to a comprehensive system has been to assign each communication function a separate (time or frequency) channel on facilities either continuously constructed along a roadway or at certain discrete locations (intersections).

Another approach to comprehensive systems has been the Random Access Discrete Address (RADA) addressing techniques. These techniques use a common-frequency band to selectively call or address any of the total subscribers in a communication net situation.

Another approach has been to broadcast highway information at posted frequencies requiring manual tuning.

The Lyle U.S. Pat. No. 2,259,316 teaches the use of a highway radio system for giving recorded messages of local historical landmarks as well as warning of local traffic hazards. Two-way voice communication systems are shown in the Halstead U.S. Pat. No. 2,459,105 and the McCay U.S. Pat. No. 3,433,035. The Halstead U.S. Pat. No. 2,442,851 teaches the use of a traffic signalling system controlled by a central station and provides the means for broadcasting from the local stations a plurality of messages indicative of local traffic conditions. Modifications of this general traffic system are shown in the Halstead U.S. Pat. Nos. 2,260,315, 2,255,055, 2,254,218 and Re. 21,818.

Gelushia et al U.S. Pat. No. 3,532,986 discloses a warning system for vehicles comprising a transceiver, a speaker, microphone and a visual indicator for each auto.

Gordon U.S. Pat. No. 3,510,777 shows a digital calling system using a shift register in the encoder for transmitting a unique coded pulse to address a particular receiving remote station.

Halstead U.S. Pat. No. 3,534,266 discloses a system for the automatic transmission and reception of repetitive messages employing F.M. broadcast transmitters using "start" and "stop" signals together with the information or program material. The program cycle is initiated by the operator and automatically terminates after completion of the cycle. The system invented here includes this single-cycle feature. The Graham U.S. Pat. No. 3,441,858 describes a highway communication system in which electronic signals are digitally coded to provide motorist aid requests and also the response to indicate that help is on the way. The signals can be sent either from pre-located roadside transmitters (call-boxes) or from the car.

The Wisniewski U.S. Pat. No. 3,492,581 describes a system of roadside transmitters requesting motorist aid, which use unique codes that identify their location to the receivers located at the aid sources.

The Salmet U.S. Pat. No. 3,375,443 describes a system which shares a frequency band among multiple simultaneous users, similar to RADA systems.

Volunteer systems, using Citizens Band channels, have been used for motorist aid communication and traffic condition dissemination.

An automatic Electronic Route Guidance System (ERGS) was pursued (by General Motors) using an intersection addressing concept. The nation's intersections were assigned a codeword, and each participating vehicle is instructed at each intersection he passes via a two-way vehicle highway communication link. The vehicle transmits a destination, and the highway returns the correct action at that intersection (straight, left, or right). A Radio Road Alert system (pursued by Ford Motor Company) used stored messages in the vehicle, which were to be triggered by roadside transmitters.

Finally, a continuous highway communication facility consisting of a repeater-system (called $F_1 - F_1$ repeaters) has been developed to permit communication for vehicles on an expressway.

DESCRIPTION OF THE DRAWINGS

Drawings accompany the disclosure and the various views thereof may be briefly described as follows:

FIG. 4 shows a block diagram for the complete vehicle transceiver, including receiver and transmitter. It is broken into three sheets because of size.

DETAILED DESCRIPTION OF THE SYSTEM

Figure 1:
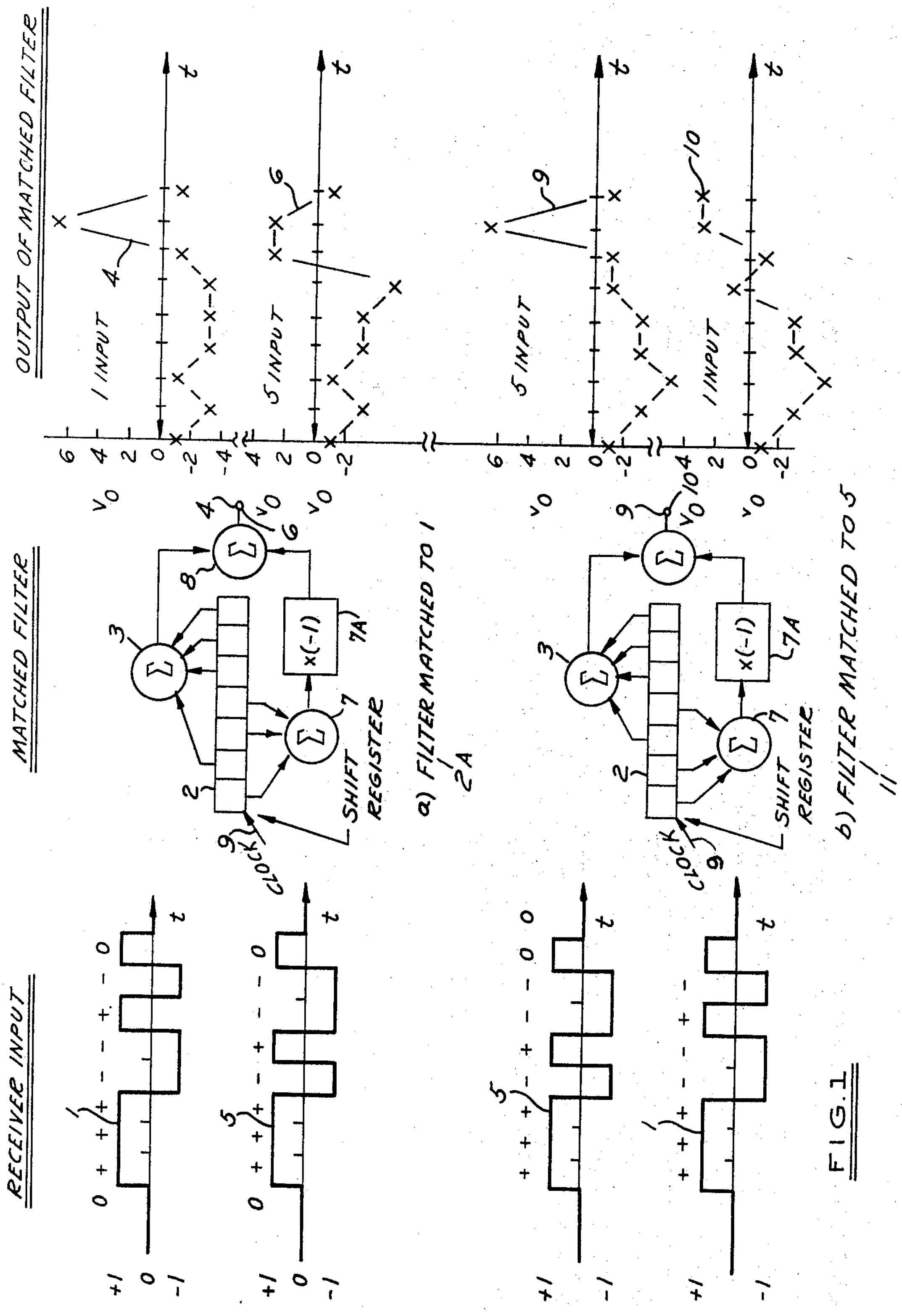
FIG. 1 illustrates the fundamental use of the maximal sequence special codewords that simultaneously address the various functions and provide a digital or tuning-command modulation. The illustration includes two baseband codewords, the corresponding two filters matched to each codeword, and the matched filter outputs when both correct and incorrect codewords are the input. Codewords similar to these are used in the nationwide highway channels of the system.

An open-ended comprehensive vehicle radio system is effected by combining function-addressing with an M-ary digital modulation. The digital modulation is used to either: (1) send an M-ary (one of M) digital messages; (2) command-tune a receiver or transmitter for extended communication; or (3) measure a time interval between events to provide distance and position information.

Most vehicle communication uses the common-function mode where the vehicle equipment is shared among the totality of functions. In this mode the receiver is caused to receive one-cycle of a repetitive roadside transmission for any of a range of functions available. Dedicated mode refers to those repetitive signalling functions where system equipment is not conveniently time-shared; hence, the equipment is dedicated for the duration of that function.

Two major features of the common-function mode, through which most of the vehicle communication can be accomplished, are:

1. A nationwide highway channel is allocated as the channel in which either an M-ary digital message or a tuning-command for ensuing extended communication is transmitted. Only the special codewords are used in the highway or command channel.

2. Any ensuing extended communication (beyond an M-ary digital message) is conducted at a locally desirable channel using closed-circuit or limited range propagation. The extended communication may be either conventionally modulated digital or analog (voice).

The transmission link between vehicle and environment can limit propagation in space by using a closed-circuit arrangement consisting of a buried roadside cable or a buried roadway antenna along with a downward looking vehicle antenna. Such closed-circuit operation appears best for permanent roadside stations. Where desirable, a power-limited (and hence range limited) broadcast mode transmission may be used, using either omnidirectional or directional antennas.

The special codewords in the command channel exploit what is termed "coding multiplexing." The total range of functions can be handled on a single frequency channel by using this coding-multiplexing in conjuction with permanent "function-addressing." With function addressing, each specific communication function is assigned a unique and permanent special codeword which will be used in the command channel whenever that function is exercised (allowance can be made for future as yet unthought of functions by setting aside some codewords).

For transmission to the vehicle, roadside (or vehicle) transmitters repetitively transmit cycles which contain a spaced pair of assigned codewords for a particular function on the highway channel, and a modulated extended message on a locally clear channel (if used). Cycles of this type are repeated for each function that is available at a given site. When the passing vehicle comes in range, the codeword-pair in some cycle captures the vehicle receiver if the operator has requested a given function (or if the message is urgent). The code-word-pair conveys an M-ary digital message or "frequency-commands" via electronic tuning the receiver (or the response transmitter) to the frequency which is to be used for any extended communication. If the ensuing transmission is closed-circuit, an internally suitable frequency can be used. If a local broadcast mode is desirable, then the frequency-command automatically tunes the receiver to a channel which is locally suitable for a range restricted (ensuing) transmission. In either case any voice (or extended digital) message will then be transmitted at the commanded frequency. At the end of the message the vehicle radio will revert back to normal broadcast reception.

Whereas the command channel and its codewords are standardized throughout the nation, any frequencies for local broadcast transmission, for a given function will differ, depending on the locally clear channel. In communications terms, one is using coding multiplexing for the various communication functions or sources and using conventional frequency multiplexing for any extended voice or digital communication in the closed-circuit or the broadcast mode.

The special codewords which implement the function addressing and digital modulation are a sequence of binary (digital) signals. The special binary sequence modulates a carrier via phase shift keying. One preferred candidate for the binary sequences are sequences formed with single periods of maximal length sequences. Table 1 shows the number of maximal sequences which are available for a given length.

TABLE 1

Table for Maximal Length Sequences

| Number of Register Stages, $n$ | Length of Sequence, L | Number of Maximal Sequences |
|---|---|---|
| 2 | 3 | 1 |
| 3 | 7 | 2 |
| 4 | 15 | 2 |
| 5 | 31 | 6 |
| 6 | 63 | 6 |
| 7 | 127 | 18 |
| 8 | 255 | 16 |
| 9 | 511 | 42 |

Since the receiver shift register will have a length equal to the length of the sequence, we see that there are relatively few maximal sequences available for modest sequence length (less than 63).

Another set of sequences that appear more practical for the application here are those from the family of sequences generated by certain non-maximal sequence generators. These sequence generators combine two maximal sequences (related by preferred polynomials) at various phase shifted positions. The use of preferred polynomial sequences is a specialized topic and will not be treated here, except to note that it constitutes a known method for achieving a set of sequences having good auto- and cross-correlation properties. Table 2 shows a table giving the relation between sequence length and number of sequences available if one uses the preferred polynomial non-maximal sequences. The shift-register polynomial is the product of the preferred polynomials.

TABLE 2

Table for Preferred Polynomial Non-Maximal Sequences

| Number of Register Stages, 2n | Length of Sequence, L | Number of Sequences |
|---|---|---|
| 6 | 7 | 9 |
| 10 | 31 | 33 |
| 12 | 63 | 65 |
| 14 | 127 | 129 |
| 18 | 511 | 513 |

Either the maximal or the particular non-maximal sequences are useful here because: (1) generating these sequences is especially simple, (2) the autocorrelation and the crosscorrelation properties of the finite non-periodic sequences are near optimum, and (3) the matched filter receiver for these sequences is no more complex than for any binary sequence.

The (baseband) vehicle receiver for the command-channel consists of a shift-register of the same length as the codeword sequences. Provision is made to effect a "matched filter" for each of the codewords possible in the system. The matched filter is effected by summing the appropriate register stage outputs, which changes with each codeword. When the motorist requests a given service, he connects the proper register stages for the codeword associated with that service by a "button-punch." The vehicle receiver is alwyas "matched" to emergency warning and official message codewords (without driver initiation).

FIG. 1 illustrates the vehicle receiver codeword behavior at baseband, using two seven-long maximal length sequences. A single seven-long period of the sequence is used, plus the first bit of the next period. Two maximal sequences, 1 and 5, consitute the two baseband signals. The baseband matched filter 2A is matched to sequence 1 and is comprised of a shift register 2 and summers 3 and 7 used to add the contents of the stages shown. The output of 7 is multiplied by minus-one in an inverter 7A. The output summer 8 adds the output of the summer 3 and the inverted sum from 7. The output 4 consists of the voltage versus time as the sequence 1 is loaded into the shift-register via the shifting clock 9.

When the second (non-matched) sequence 5 is shifted into the same shift-register 2 the output voltage 6 is observed as a function of time. It is seen that the output voltage 4 for the matched signal reaches a peak of seven while with the unmatched input 5 the output has a maximum value of only three. A Schmitt trigger is used to detect the occurrence of the seven-unit voltage peak in 4. The two output waveforms 4, 6 assume that the register stages were initially set to contain all −1's.

When the same two sequences 5 and 1 are placed into the matched filter 11, which used the same shift-register 2 and summers 3, 7 and 8, but now connected to be matched to signal 5, the output voltages 9 and 10, respectively, are observed. Again the correct signal for the filter 5 causes a peak in output voltage 9 of seven units while the incorrect signal only reaches a maximum of three units. A similar phenomena occurs for much longer codewords of either of the types mentioned above. As seen, such sequences have both good autocorrelation and good crosscorrelation properties.

Since the "matched point" defines a unique time, one can convey any M-ary digital message or any frequency-command modulation by transmitting a pair of codewords, and making the distance ($\tau$) between codewords be proportional to the frequency (command) setting or the M-ary digital message.

The total range of $\tau$ is divided into two regions: $\tau$ values from one to M are used for an M-ary digital message, and can often complete the communication. Then the $\tau$-spacing simply indicates a number, a letter, or Yes-No answer. The range $\tau > M$ is used if an audio message or an extended digital message is to be transmitted on a prescribed frequency. Now the $\tau$ values correspond to receiver (or transmitter-response) frequencies.

Figure 2:
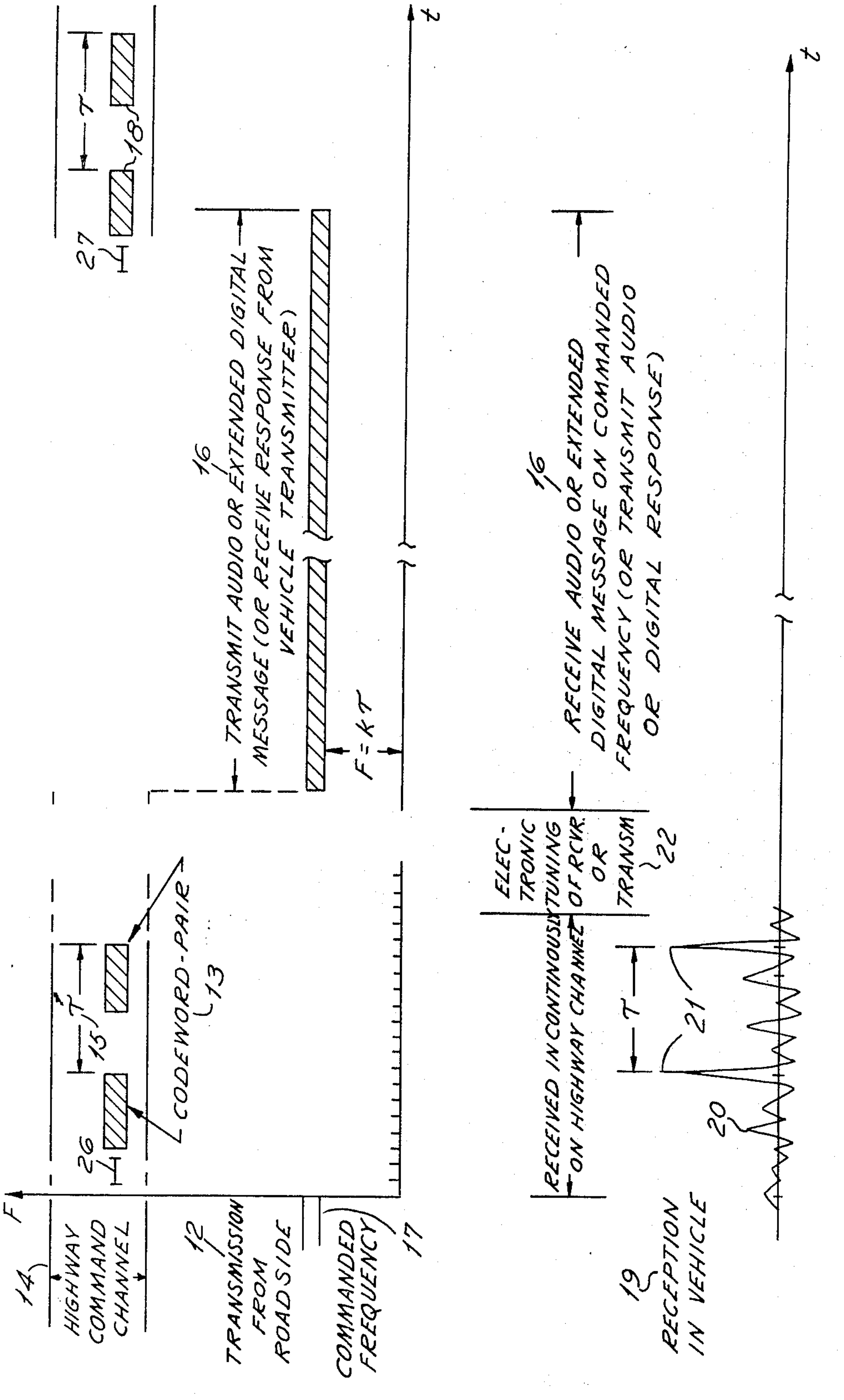
FIG. 2 is a time-axis depiction of the system events for vehicle-environment communication. The action at a roadside transmitter and the corresponding action in the vehicle transceiver is shown.

FIG. 2 shows the general time axis description of the common-function environment-to-vehicle (and return) system. The upper part 12 shows the behavior that occurs at any of the roadside (or environment) sources of information. When a given communication service is available, a pair of codewords 13 assigned to that function are repeatedly transmitted in the nationwide highway frequency channel 14. The $\tau$-spacing 15 between the codewords is modulated by the frequency command or digital message carried by that codeword pair.

If extended communication is used, a tape-recorded loop is used to transmit an audio message or extended digital message (or a response from the vehicle is received) in the next time interval 16. The extended communication takes place at a locally clear frequency 17, using either a braodcase mode or a closed circuit mode. The frequency 17 is selected by the local official controlling that function, and based on a prior accumulated knowledge of clear and available frequencies. A preamble signal 26 precedes each codeword pair to provide clock positioning at the receiver. This preamble 26 consists of a burst of sine wave at the highway channel carrier frequency. The preamble serves to align the clock at the receiver to the center of the bit sequence intervals.

At the end of each codeword-pair followed (possibly) by an extended message, the environment transmitter repeats the cycle as shown by the next codeword pair 18. The vehicle receiver will receive one and only one such cycle unless a repeat is requested.

The lower part 19 of FIG. 2 shows the corresponding action at the vehicle transceiver. The matched filter output 20 goes through random values, but there are two definite and recognizable peaks 21 that occur at the matched positions. Depending upon the $\tau$ value, the vehicle transceiver either: (1) turns on one of M digital indications, or (2) tunes to a frequency commanded by the time interval $\tau$ and receives an audio message (or transmits a digital or voice response from the vehicle). The reception of the audio message occurs during the same time interval 16 during which the environment transmitter is transmitting the message. The time interval 22 indicates the time necessary to ccomplish the tuning of the receiver or transmitter.

Figure 3:
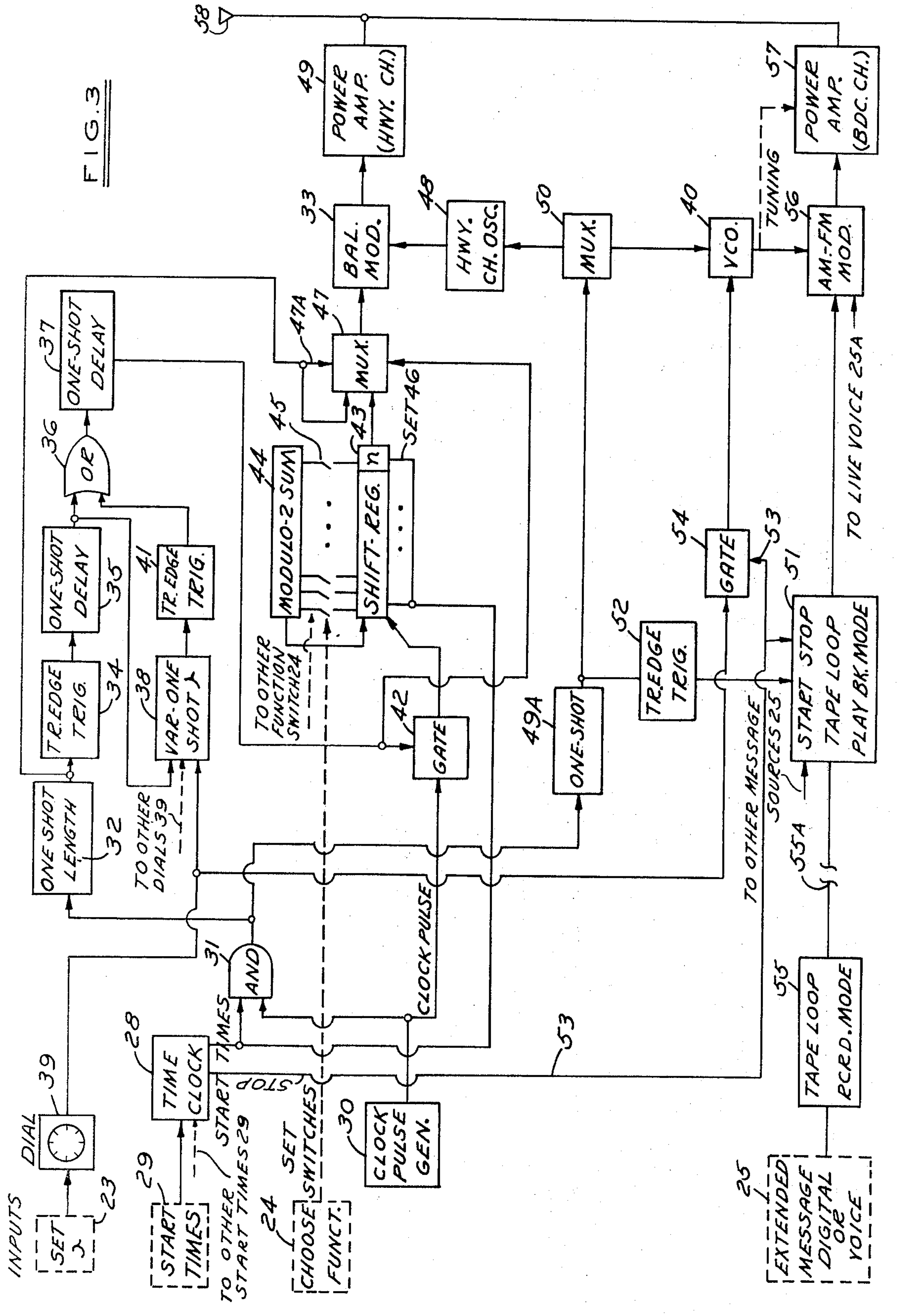
FIG. 3 shows a block diagram of the roadside transmitter. Both common-function and dedicated function transmissions use this basic transmitter. The block diagram shows detailed construction for one function and indicates the connections for multiple functions. Extension of construction to multiple functions is straight forward.

FIG. 3 shows the general arrangement for the roadside or environment transmitter for transmission to and from the vehicle. This is an all-purpose transmitter and provides for both O-M digital messages and the extended messages (either voice or extended digital) for both common- and dedicated- functions. The four transmitter inputs required (on the left) are a $\tau$-setting 23, the cycle starting time 29, the choice of function 24, and extended message (either voice or digital) 25. When a live voice is used, the voice input 25A directly inputs the modulator 56. FIG. 3 is composed of three major aspects: The clocking and control function (left and upper), the generation of the codewords (center) and the transmitters (right). FIG. 3 shows the detailed construction for a single function and the connection points for multiple functions. Extension of construction to multiple functions is straight forward. The action begins with a time clock 28. Cycle start times in terms of seconds from midnight are entered via the start times setting 29. These starting times may be sparse (for common function with extended messages) or repetitive for dedicated functions. At each such starting time, the time clock 28 becomes active for a period exceeding a clock interval. Controlling the start times permits time multiplexing of different codeword pairs on the same transmitter at a given location. The start times will be determined both by the time multiplexing consideration and by the message lengths of any extended communication.

The clock pulse generator 30 produces a clock pulse repetitively at the desired clock rate of both the transmitter and the receiver. The preamble signal begins at the first clock pulse after a given cycle-start time occurs. The AND gate 31 triggers at the first clock pulse after the start time, and triggers a one shot multivibrator 32 whose active (or ON) length corresponds to the length of the preamble signal 26 of FIG. 2. In all multivibration action we will assume that the output is around zero when the multivibrator is off or low, and is a positive voltage when the flip-flop is on, active, or high. The remainder of the description will use this convention. The one-shot 32 goes high for the preamble length. This causes the balanced modulator 33 to provide a burst of carrier sine wave at the highway channel carrier frequency for a time corresponding to the active period of one shot 32. The one shot 32 is followed by a trailing edge trigger 34 which triggers when the one shot 32 goes low. The trigger 34 triggers a one shot delay 35, which forms the dead period between the end of the preamble and the beginning of the first codeword. This dead period is used (later) in the receiver to correctly position the receiver clock with respect to the transmitter clock 30.

The first codeword of the pair 13 (FIG. 2) is gated on by the one shot 37 with an active period equal to the length of the codeword. This one shot 37 is triggered through the OR circuit 36 and gates the clock pulses to generate the codewords. The trailing edge of the delay unit 35 triggers both the first codeword epoch with the one shot 37 and the variable one shot 38. The length of the variable active period for the one shot 38 is determined by a voltage-controlled capacitor supplied by the voltage setting from the $\tau$-input voltage dial 39. The dial 39 is set by the operator who refers to a chart showing the relation between settings and either M-ary digital messages or frequency settings. The dial 39 sets up a DC voltage which controls both the $\tau$-interval determined by the variable one shot 38 and the frequency of the varactor controlled oscillator 40. When the $\tau$-interval generator 38 goes low, the trailing edge trigger 41 enters the OR circuit 36 and again triggers the one shot 37 to gate on the clock pulses to generate the second codeword of the pair. The one shot 37 forms the control signal for the gate 42 which gates the clock pulses entering the *n*-stage shift register 43. The clocked pulses from the pulse generator 30 pass through the analog switch gate 42, when the gate control is high and will not pass when it is low.

The shift register 43 is used to generate maximal sequences and contains *n* sequential shift register stages and the contents of any given stage shifts to the right whenever a clock pulse is entered. For maximal sequences the particular binary sequences for a given function codeword are generated by shifting the initial contents of the register to the right, and inserting a new bit into the leftmost stage in accordance with a feedback loop using the modulo-two sum, 44 of the contents of various stages. By using various correct combinations of closed switches 45, the various desired codewords are generated. The switches 45 are connected in accordance with the choice of communication function as set by input 24. The initial contents of the register are caused to be all ones; this is caused by having the start time signal from the time clock 28 also "set" each of the register stages to the one position via the set input of all flip-flops 46. Then each clock pulse through the gate 42 shifts the initial contents to the right and a new digit is entered on the left in accordance with the modulo-two sum of the connected stages via switches 45. The result is the baseband codeword that has been preselected by the switch settings 45. In this way the baseband codeword pair 13 and 18 of FIG. 2 are generated using maximal sequences.

If the family of non-maximal (preferred polynomial) sequences is used, the sequence generator 43 through 46 must be modified. Rather than selection of feedback taps to determine the particular sequence, as with maximal sequences, it will be necessary to use a fixed set of feedback connections and determine the particular sequence from the family by the initial condition of the generator.

The time multiplexer 47 is a one-out-of-two line-selector (multiplexer) that serves to first connect the balanced modulator 33 to the preamble gate coming from one shot 32 and then to the two spaced codewords coming from the shift register 43. The control signal from the one shot 32 is also used for the control gate 47A (with a possible level shift) for the multiplexer. The gate control for the multiplexer when the codeword generator is connected comes from the one shot 37 which is the control gate for the codeword length.

The output of the multiplexer 47 is connected to the balanced modulator 33. When a positive gate from one shot 32 enters the balanced modulator, a sine wave of duration equal to the ON time of the one shot occurs at the output with frequency $f_c$ which is the carrier frequency of the highway channel. When the gate 47A goes off the balanced modulator output becomes zero.

When the plus and minus values from the shift register 43 are gated into the balance modulator via the control signal from the one shot 37, the balanced modulator produces a phase shifted signal consisting of the 0° and 180° phase shifts of the highway-channel carrier frequency. The carrier frequency for the balance modulator is provided by an oscillator 48. The power amplifier 49 is the final item in the generation and transmission of the preamble and codeword pair for the command channels in the common-function and the dedicated-function mode.

The one shot multivibrator 49A controls the switching between the preamble-plus-codeword-pair and any extended message portion of the single-cycle communication. The one shot provides a control signal for the analog switch multiplexer 50. When the one shot 49A is high, the oscillator 48 is activated and the highway channel transmits the preamble-codeword-pair. When the one shot 49A is low, the varactor control oscillator 40 is activated for extended communication transmission. Any extended communication takes place at the r.f. frequency commanded by the $\tau$-setting 23 as implemented by the varactor controlled oscillator 40.

Any extended message information is recorded on a magnetic tape, preferably a tape loop 51. The start signal for the tape recorder playback (or loop) is provided by trailing edge trigger 52. The stop signal 53 for the tape recorder playback is obtained from the time clock 28 which initiates each new cycle for the roadside transmitter. The stop times are set at a time increment ahead of the ensuing cycle start times. The stop signal 53 is also used to operate a gate 54 which activates the varactor controlled oscillator 40. Gate 54 is used to turn off the AM carrier at the completion of the extended message. This carrier turn off will be detected in the receiver (see later) for reset purposes.

The recording of the tape loop is indicated by the extended message input 25 going into the record mode of the tape recorder 55. This may be done at any time prior to the insertion of the tape loop into the transmitter circuit (as indicated by the line-interrupter 55A).

The extended message information from the tape loop playback 51 is the information input to the AM (or FM) modulator 56. The modulator output is amplified via a tunable power amplifier 57.

Both the highway channel power amplifier 49 and the broadcast band power amplifier 57 are connected to an antenna 58. This antenna can be a roadside omnidirectional vertical whip, a roadside directional antenna, a lossy cable stretched along the roadway (for a distance that will insure adequate time for a vehicle to receive an entire message cycle assuming a random entry into the antenna area) or an antenna buried in the roadway. The first two would use the range-limited broadcast mode while the latter two would use the (approximately) closed-circuit mode.

Although the transmitting function just described with FIG. 3 pertains to a single function for the common-function mode, one may have multiple such functions available at a given place and at a given antenna. In such cases the different codeword pairs are time multiplexed on the same antenna, and any extended messages are correspondingly aligned in the time axis and use frequency multiplexing.

Figure 4A:
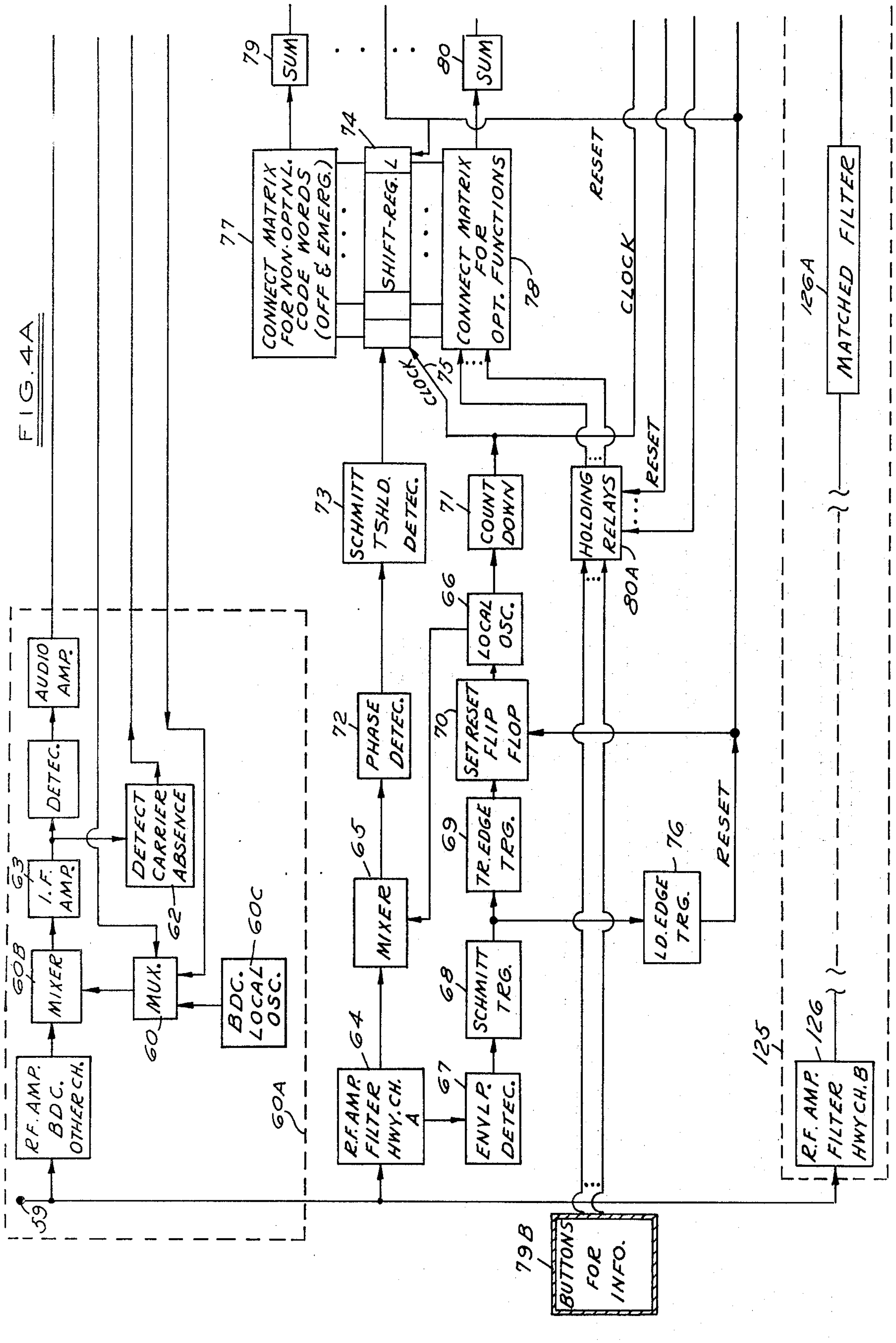
FIG. 4A shows the interface to the existing vehicle AM receiver, and the RF and IF and matched filter portions of the highway-channel receiver, with the common-function mode. A dedicated receiver is also indicated.
Figure 4B:
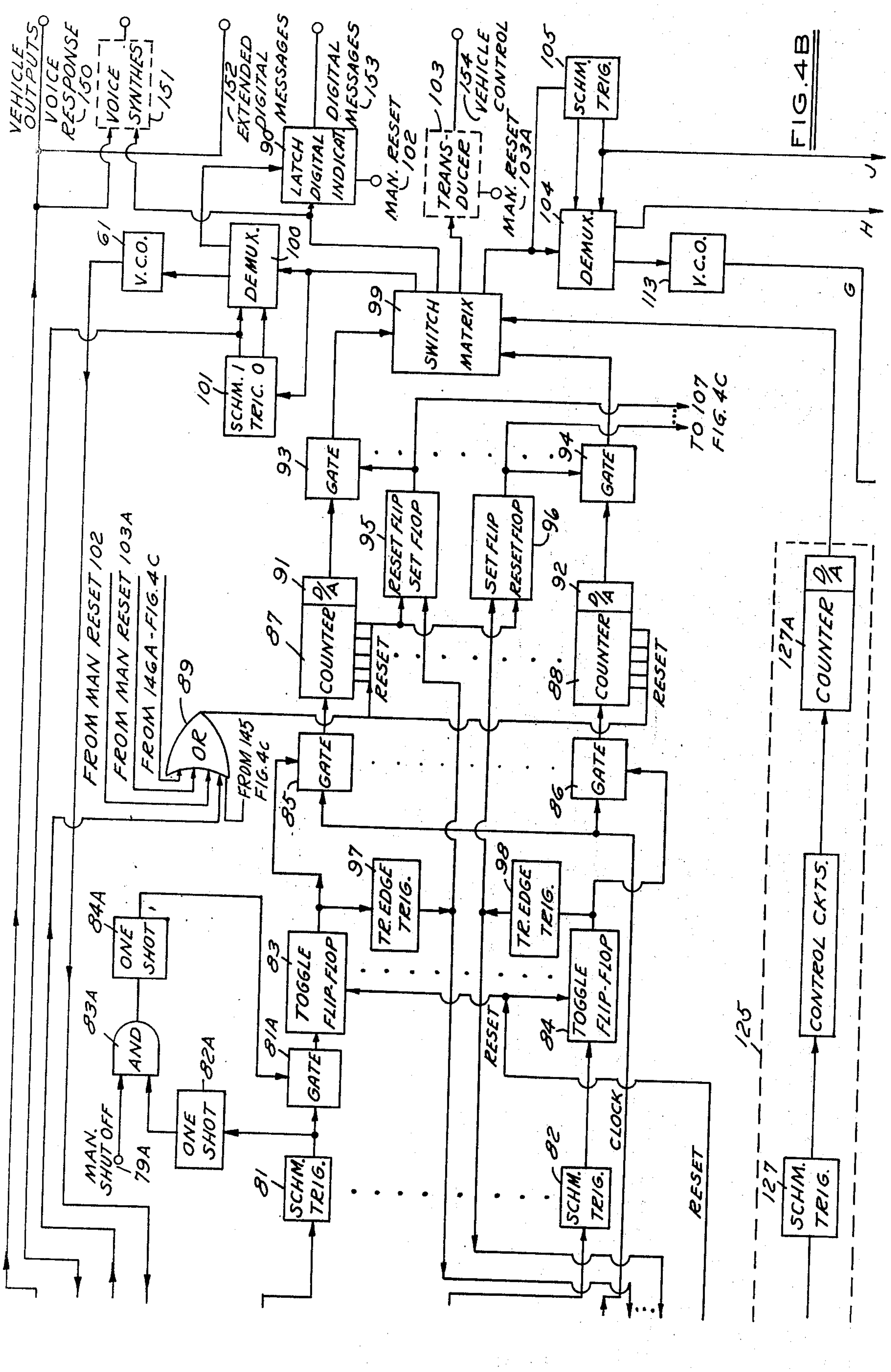
FIG. 4B shows the remaining receiver functions of the vehicle transceiver, including the counting function, their controls, and the various vehicle output responses.
Figure 4C:
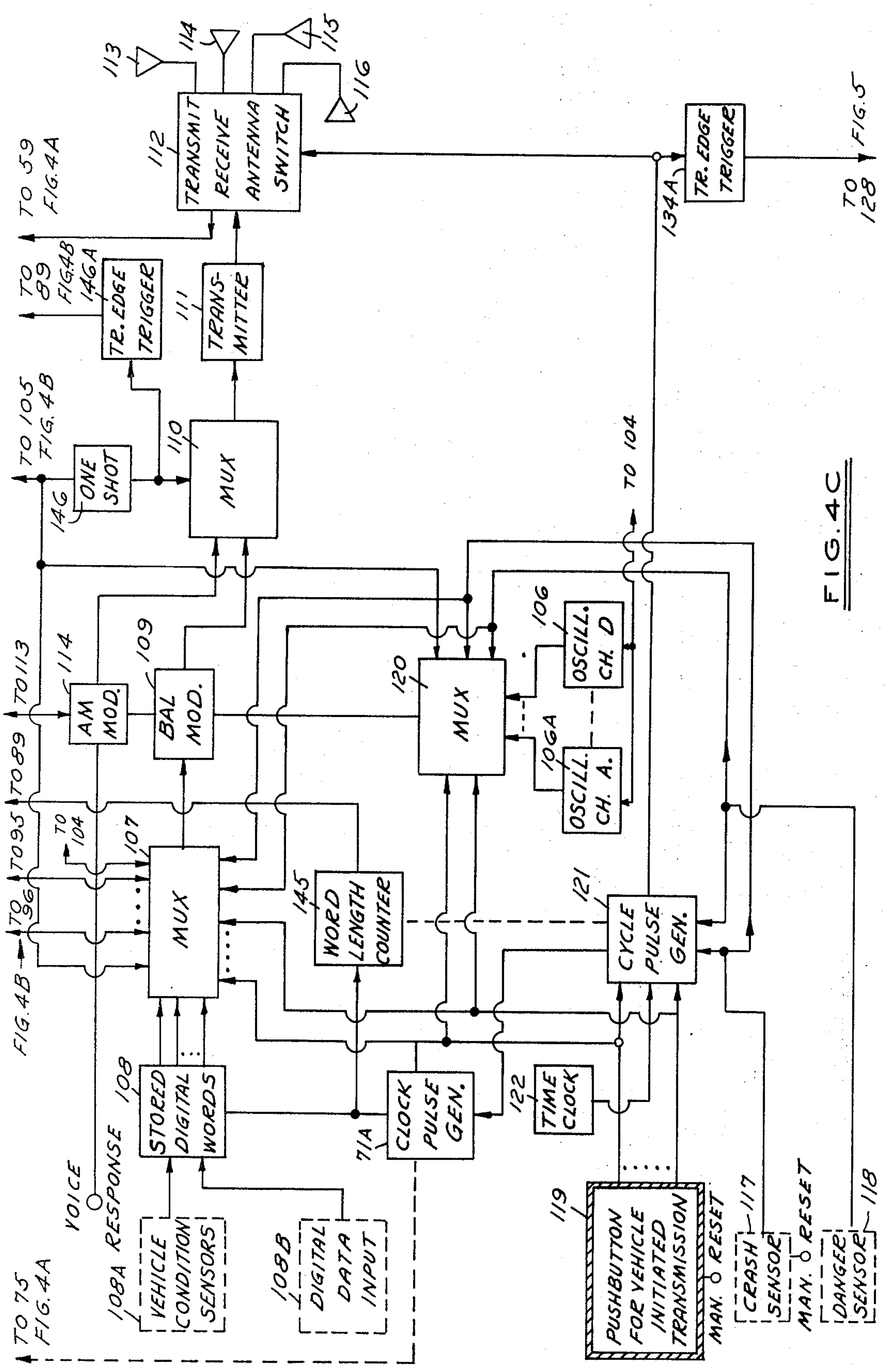
FIG. 4C shows the transmitter part of the vehicle transceiver. This includes responded transmissions and vehicle-initiated transmissions.

FIG. 4 shows a block diagram of the vehicle transceiver and is divided into three parts. FIG. 4A depicts the first part of the receiver which receives messages from the environment. FIG. 4B contains the remainder of the receiver components, while FIG. 4C describes the transmitter part of the vehicle transceiver. The left upper part of FIG. 4A, 60A, describes the present vehicle AM receiver with some additional functions. The input signal 59 for this part of the receiver comes from the transmit/receive switch 112 shown in FIG. 4C. This switch is connected to either of four vehicle antennas (FIG. 4C): vertical omnidirectional 113, forward-looking 114, downward-looking 115, and rearward-looking 116. The input signals 59 will normally come from either a roadside transmitter through the vertical antenna 113 or from a buried cable or buried roadway antenna through the downward antenna 115. The antenna switch 112 is normally in the receive connection and changes to transmit only when the vehicle transmits (see later).

The present ubiquitous AM receiver can be used for the reception of voice messages and the normal functions of the AM receiver 60A need not be reviewed here. The multiplexer (one-of-two-line-selector) 60 is an addition to the AM receiver which transfers control of the receiver from the normal broadcast tuning to the control of the highway channel. Whenever an oscillator signal from the varactor controlled oscillator 61 (FIG. 4B) is active, the analog switch multiplexer 60 will connect the varactor oscillator to the mixer 60B. Whenever the varactive oscillator 61 is not active, the mixer is reconnected to the present broadcast local oscillator 60C. The carrier-absence-detector 62 connected to the output of the IF amplifier 63 serves to detect the end of the extended message by triggering when the carrier ends and turns off the varactor controlled oscillator by resetting the system counters (treated later) via a logic OR circuit 89 (FIG. 4B).

Highway channel A is designated as the channel used for the common function handling of one-cycle messages using transmitter of FIG. 3 to and from the environment. Any encountered signal 59 on the highway channel A will appear at the output of the RF amplifier and filter 64. The highway channel components (64 and following) are continuously on stand-by whenever the vehicle is being operated (even if the AM receiver were off). The RF amplifier 64 output is fed to a mixer 65 where the signal is mixed to an IF frequency via use of a local oscillator signal 66.

The receiver system clock 75 is implemented by countdown from the local oscillator; it is necessary to position the system clock so that it is approximately centered with respect to the phase transitions of the incoming binary phase shifted signal (through 65). The preamble 26 of FIG. 2 is required for this reason. The envelope detector 67 goes high when the preamble begins and returns to low when the preamble ends. Since the vehicle will be at varying distances from the antenna as it approaches, it is necessary to assure that the vehicle radio waits until a cycle begins at which the received signal-to-noise ratio is adequate for the receiver to operate correctly. The Schmitt trigger 68 accomplishes this function by triggering only when the envelope detector output 67 reaches a sufficiently high value. When the received preamble sine wave is sufficiently high, the Schmitt trigger 68 goes high at the beginning of the preamble signal and returns to low at the end. The trailing edge trigger 69 triggers at the preamble turn-off, and "Sets" a Set-Reset flip-flop 70. The flip-flop 70 is initially in the reset position caused by having the leading edge trigger 76 trigger at the beginning of the received preamble signal. This trigger 76 resets the flip-flop 70, the shift-register stages 74, and the counter control flip-flops 83, 84 (FIG. 4B).

When the flip-flop 70 is Set, the local oscillator 66 is fired, and is used both as input for the mixer 65 and also as input to the countdown circuit 71. The output of the countdown 71 forms the receiver system clock 75 which both shifts the shift register and also provides the time increment for counting to measure $\tau$ 15 (FIG. 2). At the transmitter (FIG. 3) the preamble is positioned with respect to the phase shift keyed transitions so that the system clock from 71 lies approximately at the mid-point of the transition points of the incoming phase shifted sequence 59 or 65.

The phase detector 72 detects the phase of the IF signal, from 65, as being either 0° or 180°, and outputs a baseband signal having low output for 0° and high output for 180° (or vice versa); (This signal is of the general nature of that shown as 1 or 5 in FIG. 1.) The Schmitt trigger 73 serves to square up the output of the phase detector 72. The baseband (binary) signal from 73 inputs the shift register 74.

Shift register 74 is an L-stage (L = bit-length of codewords) binary shift register which, along with the connection matrices 77, 78, implements a baseband matched filter for any of the desired one-cycle communication functions. The shift register stages are initially all reset to the zero-state due to a reset signal from the leading edge trigger 76. Each clock signal 75 shifts the contents of the register to the right; thus the incoming bits from Schmitt trigger 73 are fed sequentially into the leftmost stage. The input baseband codewords, such as 1, 5 of FIG. 1, are entered into the register in this fashion.

Figure 6:
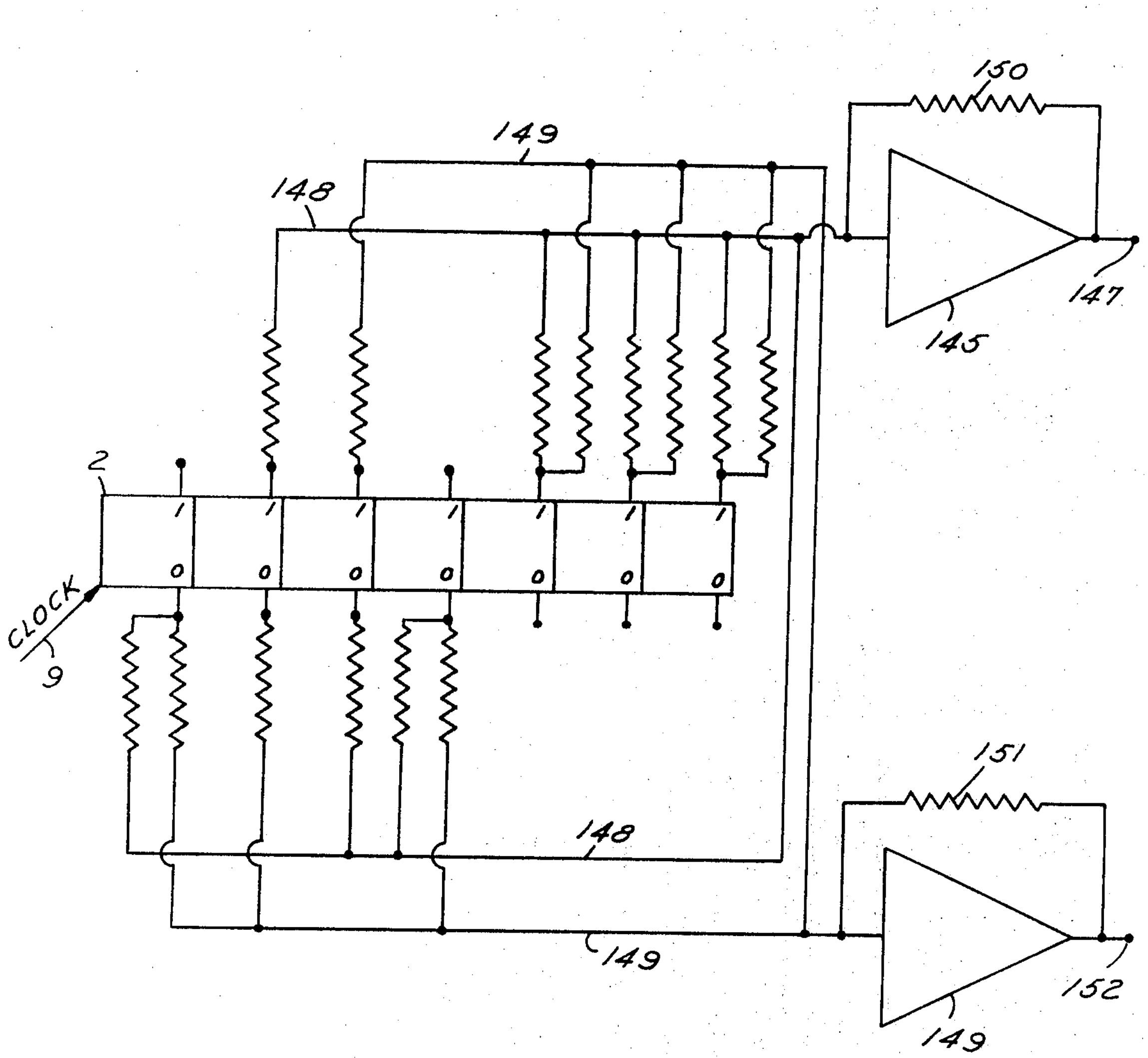
FIG. 6 shows a detailed circuit connection for the non-optional baseband matched filter (shift-register, connection matrix and summer), using the two sequences illustrated in FIG. 1.
Figure 7:
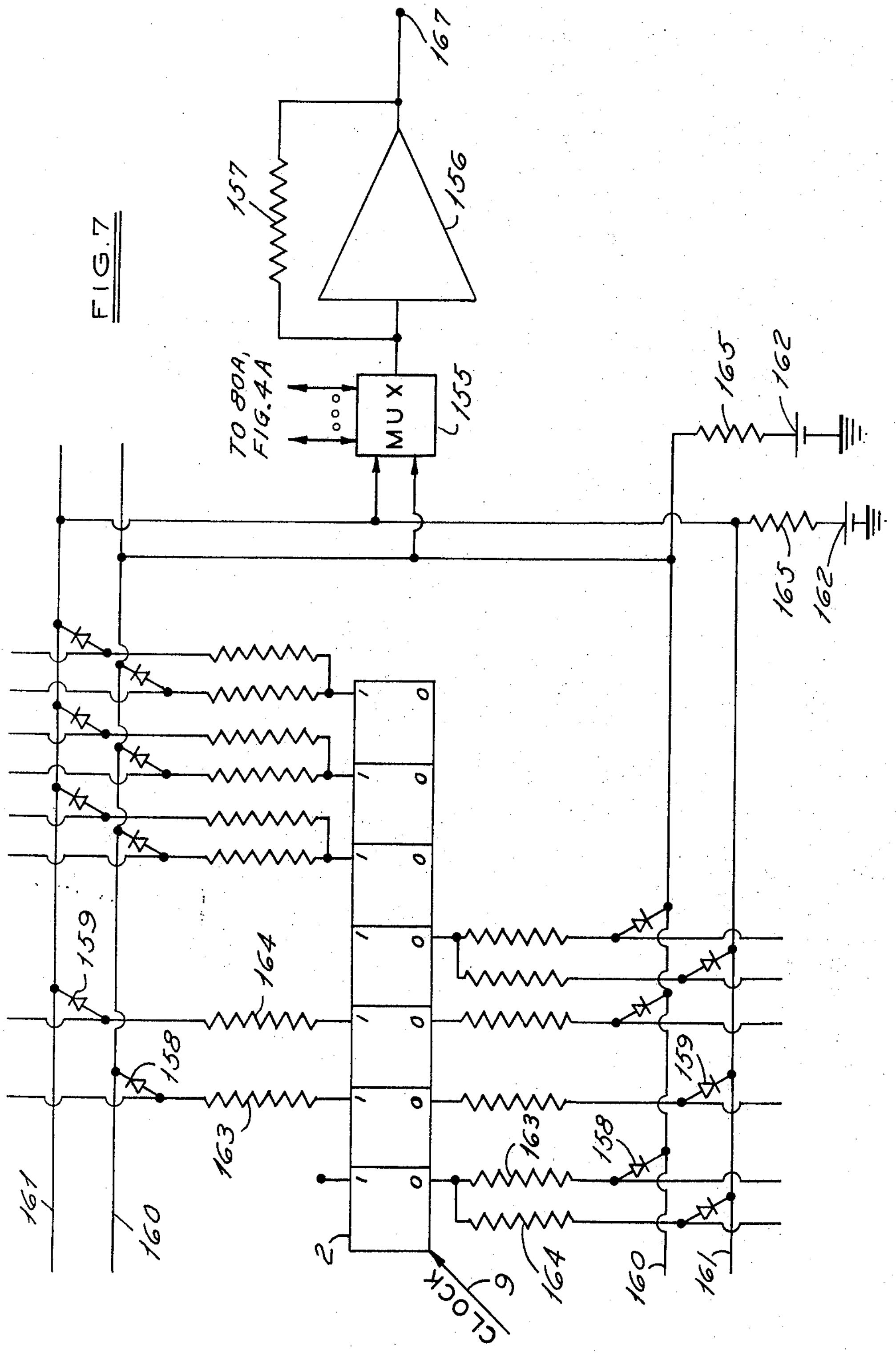
FIG. 7 shows a detailed circuit connection for the optional baseband matched-filter (shift-register, connection matrix and summer), again using the two sequences illustrated in FIG. 1.

The equipment here uses the "common-function" mode, as opposed to being dedicated to a given function: hence the receiver must be "matched" to a variety of different codewords. A connection matrix is used to connect the proper shift register stages for each particular function that is available. The connection matrix 77 (see also FIG. 6) provides those combinations of shift register stage connections which are appropriate for each of the non-optional (official and emergency) codeword functions. Vehicles will receive all non-optional messages without driver request. The matrices 77, 78 provides shift register-to-summer connections similar to those provided to the summer 3 in FIG. 1. The connection matrix for optional functions 78 provides similar connections for the shift register stages, but now the particular connections at any given time are controlled by the push-button requests from the vehicle operator (see also FIG. 7). The push-button panel 79B feeds a set of holding relays 80A. Whenever a given function (message) is requested, the corresponding button push activates one of the holding relays 80A for the corresponding function. The holding relay 80A will remain set until a reset signal is received after complete reception of the corresponding codeword from the environment. Any active holding relay 80A causes the proper connections of the shift register stages for that function in the connection matrix 78. The reset signal to holding relay 80A from trigger 98 (FIG. 4B) causes one-cycle of the repetitive transmissions from the roadside transmitter to be received for any optional function. FIGS. 6 and 7 give detailed descriptions of the implementation of connection matrix 77 and 78, respectively.

The connection matrix outputs are connected to summers 79–80 which properly sums the register contents from the stages which are connected by the connection matrix. The summers 79–80 are identical in function and play the same role as the combination of summers 3, 7, and 8 in FIG. 1. There is one such summer (and ensuing component) for each non-optional codeword and each optional codeword. A series of dots indicate that there are a series of such similar components between the two series of components 79 to 93 and 80 to 94. Reference will be made to two items in describing the next few functions to indicate there is a separate item for each communication function.

FIG. 4B continues from the right of FIG. 4A. The Schmitt triggers 81–82 serve to detect both the presence of a matched codeword and the quantized time (clock pulse) at which the codeword reaches the matched position in the receiver matched filter formed by the shift register 74, the connection matrix 77 (or 78) and the summer 79 or 80. These Schmitt triggers 81–82 will activate if and only if the matched codeword is entirely loaded into the shift register. Momentarily assume that the gate 81A is closed. This gate is used to enable reception of only one cycle of the non-optional functions. The Schmitt triggers 81–82 then input the toggle flip-flops 83–84. The flip-flops 83–84 are initially reset at the beginning of the preamble by the leading edge trigger 76. For any given function, the first trigger from Schmitt trigger 81 corresponds to the matched peak for the first codeword of the pair and turns the toggle on (goes high). A second trigger from 81 will occur when the second codeword of the pair is fully loaded into the register. This second trigger will toggle the flip-flop 83 back to off (go low).

The toggles 83–84 serve as the control signals for the gates 85–86. The gates 85–86 control the entrance of clock pulses into the counters 87–88. Since the toggles 83–84 have an on-length equal to the $\tau$-interval (15, FIG. 2) used when transmitting, the counters 87, 88 will achieve a count corresponding to the number of clock pulses which occurred during the $\tau$ interval (which is the spacing between the two codewords in the pair).

The counters 87–88 are reset either: (1) when manual reset is used at the end of a latched digital message (where the $\tau$ interval itself contains the message); (2) at the end of any extended message; (3) at the end of any automatic vehicle control operation; or (4) at the end of a vehicle-transmitted response. The reset signals for counters 87–88 are formed from the OR circuit 89 which receives inputs from each of the four possibilities. One input to 89 comes from the carrier-absence detector 62 which will occur at the end of any extended message. Another input comes from a manual reset signal when the latching digital indicators 90 are manually reset. A similar manual reset would come from any transducer 103. The final input to 89 comes from the transmitted word-length counter 145 (FIG. 4C).

The clock count accumulated by counters 87–88 are converted to quantized voltage values by the digital to analog (D/A) converters 91–92. These voltages are stored or retained so long as the corresponding counter is not reset. Gate 93–94 are used to wait until the final τ-count is reached before forwarding the digital message or the frequency command contained in the voltage from 91–92 to the various possible output functions. The gates 93–94 are controlled by the set-reset flip-flops 95–96. The trailing edge triggers 97–98 trigger when toggles 83–84 go low. Thus, the trigger from 97–98 detects that the τ-interval has been completed. The trigger from 97–98 sets the flip-flops 95-96 and hence activates the gates 93–94. In this manner the final τ-count is passed forward (and held) to the output response indicators.

The gate 81A enables manual reset 79A of the non-optional functions. Trigger 81 sets a one shot 82A whose on-period is somewhat greater than the codeword-pair plus extended message length. The one shot 82A will be set when the first codeword (of repetitive cycles) arrives. If, at the end of the emergency message, the operator pushes manual reset 79A, and AND circuit 83A will set a one-shot 84A which has an on-period of a few minutes. The setting of 84A opens gate 81A. Hence, further immediate receptions of that particular emergency function are prevented until (presumably) the vehicle is out of range. Note that emergency messages will automatically repeat unless the operator takes action.

A simple switching matrix 99 connects the various functions with the various possible output responses. Some functions will always have only a digital message or an extended message depending on whether or not the τ-count exceeds M. Other functions will activate a transducer (automatic braking) while still other functions require a transmitted response from the vehicle (vehicle identification for automatic tolling or motorist aid request). The switching matrix 99 connects the various gate outputs 93–94 to the proper output response.

Those functions which may possess either a single M-ary digital message or an extended message are connected to a demultiplexer (Demux) 100 in parallel with the Schmitt trigger 101. The demultiplexer is a select-one-of-two-lines analog switch and is implemented with MOSFET gates. The Schmitt trigger 101 acts as the control for the demultiplexer 100. When the τ-count voltage is less than that voltage corresponding to an M-ary digital message, the demultiplexer 100 connects the output voltage from the corresponding counter 91–92 to the latching digital indicator 90. Hence, any single M-level digital message will appear on latched digital indicator 90. The latching digital indications 90 will remain active until a manual reset button 102 is pushed. Pushing this manual reset button 102 will reset the counters 87–88 and the flip-flops 95–96.

If the τ-count voltage is higher than that corresponding to an M-ary digital message, the demultiplexer 100 connects the given voltage to a varactor controlled oscillator 61. The Schmitt trigger 101 output is also used to control the multiplexer 60 (FIG. 4A) in the modified AM receiver. The multiplexer 60 is "captured" by the signal from Schmitt trigger 101 and the commanded oscillator frequency from the varactor controlled oscillator 61 becomes the local oscillator for the mixer 60B in the AM receiver (FIG. 4A). By this method the codeword pair spacing is used to command the frequency for any extended digital or analog message reception.

All components remain as just described so long as there is an incoming carrier 59 present at the frequency which is being used for the extended message. When the carrier is turned off (by the roadside transmitter) indicating end of extended message, the carrier-absence-detector 62 activates and resets the counters 87–88. This in turn causes trigger 101 to go low which causes multiplexer 60 to reconnect broadcast local oscillator 60C. At this point the AM radio receiver 60A would be returned to its normal broadcast reception function. The carrier-absence detector 62 also resets the counters 87–88 and flip-flops 95–96. We have just described how a voice response 150 for extended messages is implemented.

Extended digital messages can be sent either by letting M become fairly large for certain functions or by using an auxiliary frequency commanded channel similar to the operation just described for receiving AM modulated voice. The AM transmitted signal could be digitally modulated so that the identical equipment can be used for extended digital output messages 152.

If economically feasible, it may later prove desirable to add a voice synthesizer 151 to the system here. The synthesizer 151 would receive digital data inputs either from the τ-interval (<M) signalling or from the auxiliary channel and would output synthesized speech. This would reduce the roadside transmitter complexity and cost but would increase the vehicle receiver cost.

The transducer 103 is used for any single-cycle function which would effect some vehicle control function (such as automatic braking). The transducer would be an interface item external to this system.

Any common-function messages which require a transmitted response from the vehicle would utilize the demultiplexer 104. For these functions the voltage values from gates 93–94 that correspond to τ-counts between zero and M correspond to different digital messages which would be transmitted (responded) on the same (or another) highway channel. The τ-count voltages higher than M are mapped into transmission frequencies at which the vehicle transmitter responds with an extended audio or digital response.

If the Schmitt trigger 105 encounters a voltage level less than the M-ary count level, the digital voltage will be mapped into a highway-channel and alternative digital message (within a given function) combination. Therefore, the demultiplexer 104 would connect the output voltage from gates 93–94 to the multiplexer 107 (FIG. 4C) and to a highway channel oscillator 106 (FIG. 4C). The flip-flops 95–96 control the selection of the function within which different digital word messages may be selected by the digital signal from 104.

If the Schmitt trigger 105 experiences a voltage higher than that corresponding to an M-ary count level the demultiplexer 104 connects the voltages from gates 93–94 to the varactor oscillator 113. This varactor oscillator 113 provides the commanded carrier frequency for any extended transmitted response, either voice or digital. The varactor oscillator 113 furnishes the carrier input to the AM modulator 114 (FIG. 4C) which is modulated by a voice or digital input.

The vehicle (and the environment sites) are also equipped with receivers for the dedicated functions. A dedicated receiver is used for those cases where a repetitive dedicated signalling would interfere with the common-function mode of operation. These receivers are nearly identical to the receiver components described for the common-function mode and hence a separate detailed figure is not warranted. The dedicated receiver 125 (bottom of FIG. 4A) starts with an RF amplifier and filter 126 and ends with a matched filter 126A. The intervening components are similar to the components 64 through 79 of 4A. A dedicated shift-register similar to 74 of FIG. 4A is used. A connection matrix (similar to 77 of FIG. 4A) and a summer is used. The dedicated receiver is continued at the bottom of FIG. 4B, starting with a Schmitt trigger 127 and ending with counter and counter-control circuits 125, similar to 83 through 91 above. Repetitive transmitted signals will need a preamble only at the onset of the signal. The dedicated receiver 125 has a clock-driving sequence similar to the components 67 through 71 of FIG. 4. The dedicated receiver 125 detects the correct codeword from among alternative transmitted codewords in a given highway channel and ascertains the time position of the codeword similar to the receiver described for the common-function mode.

A nationwide highway channel separate from the common-function channel may be desirable for certain of the repetitive dedicated functions (traffic signal control, spacing control). The requirement for a separate channel will be impacted by: (1) the ease and cost of total system organization; and (2) the cost of vehicle transceiver equipment to properly time multiplex the common-function and the dedicated function transmissions. Such time-multiplexing is technically feasible but may be costly.

FIG. 4C shows the block diagram schematic for the transmitter part of the vehicle transceiver. This transmitter part is used both for commanded response-transmissions and for vehicle initiated transmissions. The commanded response transmissions are described first.

A vocabulary of digital words is stored in the Digital Word Store 108 which uses read-only-memories (ROM's). For some functions only one word will be needed for a response, while for others alternate words may be requested. The multiplexer 107 controls the selection of message words, and, for commanded-responses, obtains control levels from the flip-flops 95–96 (FIG. 4B). The stored digital words 108 are clocked out using the clock pulse generator 71A. This is synchronized with the system clock 75 used previously for the single-cycle receiver mode for transmitted responses.

The digital word store 108 may receive updated words from the vehicle condition sensor 108A or a possible digital data input 108B.

The selected digital word from 107 is applied to the balanced modulator 109 which is connected to the transmitter 111 through the multiplexer 110. The multiplexer 110 switches the modulating information depending on whether digital words or analog messages via voice response are to be transmitted. The multiplexer 110 normally connects the Balanced Modulator 109 and only connects the AM Modulator 114 when a signal from the Schmitt Trigger 105 (FIG. 4B) is triggered. The trigger from 105 sets a one-shot 146 whose on-period will be the a priori determined message transmission time. At the end of the on-period, a trailing edge trigger 146A resets the counters 87–88, FIG. 4B. Thus, if voice response is used, the voice message time will be limited by the one-shot 146. When the balanced modulator 109 is connected, the phase shift keyed signal from the balanced modulator 109 inputs the transmitter 111.

The transmitter signals 111 are applied to the transmit/receive antenna switch 112. The antenna switch 112 switches between transmit and receive and also is used to connect the proper antenna of the four separate antennas: (1) a vertical omnidirectional 113; (2) a forward looking 114; (3) a downward looking 115; and (4) a backward looking antenna 116.

The transmitted responses intended for the single cycle response mode being considered here would connect the transmitter 111 to either the vertical omnidirectional 113 or the downward looking antenna 115 so that the response would be received either by a roadside antenna or a buried cable.

This completes the description of transmitted responses for the common-function mode where the responses are commanded from a single-cycle message reception in the vehicle. Some applications of this would be vehicle identification for automatic tolling, stolen car checking, and either digital or voice response for describing one's location in a motorist aid situation.

In addition to handling commanded responses, the transmitter is also used for communication functions which originate in the vehicle. Some functions will be one-cycle while others will use repetitive cycles. A one-cycle transmission example would be communication of an emergency stop (or spin-out) to the nearby vehicles. The danger condition is sensed by the Danger Sensor 118 which controls a cycle pulse generator 121. For the Danger function, the cycle generator 121 would activate for a length of time equal to a preamble-plus-codedword-pair of a one-cycle message. The cycle generator 121 outputs to the clock pulse generator 71A which would clock out the danger codeword from the word storage 108. The Danger Sensor 118 also controls the multiplexer 120 which selects the correct highway channel for the single-cycle transmission. The vertical antenna 113 would be used for the danger function.

If an emergency (crash) has occurred, a Crash Sensor 117 will activate (in addition to 118), and repetitions of an emergency codeword will be broadcast until a manual reset 117A occurs. This repetitive broadcast would permit emergency aid vehicles to actively locate and find the victim vehicle using electronic (homing) emission-seeking or position-location techniques. This is an example of a temporarily dedicated use of the transmitter.

The Crash Sensor controls the cycle pulse generator 121 which now produces repetitive gate lengths, each of which has length equal to the preamble-plus-codeword pair. The action is similar to that just described for the Danger function. Now, however, a different highway channel would probably be used; otherwise, this repetitive function might interfere with the common-function operation for all other functions for vehicles in the vicinity of the emergency. The emergency crash codeword would be transmitted from all four vehicles antennas.

The remaining use of the transmitter is for any vehicle control or environment control functions which require single-cycle or a repetitive use of a signal in a highway channel (traffic light control, vehicle spacing control). This action begins with activation of a push-button 119 which again activates the cycle pulse generator 121 to cause either a single-cycle or repetitive transmissions of the corresponding digital codewords. The control of the transmitter for these dedicated transmission functions are similar to the cases just described (Danger and Crash) and will not be repeated. These dedicated function transmissions are coordinated with the common-function (single-cycle) roadside transmissions by using the time clock 122 to cause the cycle generator 121 to be time multiplexed with the known starting times of roadside transmitters.

The remaining important system function is the measurement of time intervals for distance measurement and line-of-bearing measurement. These are used for automatic vehicle spacing and position-location. The time interval may be between a vehicle-transmitted codeword and vehicle reception of a responded identical (or similar) codeword from the preceding vehicle, which implements a distance measurement for automatic spacing control (between vehicles). Alternatively, the time interval may be between a roadside transmission and reception of a responded-transmission from a stranded vehicle, which permits measurement (at the roadside transmitter) of the distance between the transmitter and the vehicle. Finally, the time interval may be between the reception times of the signal from a given vehicle at two separate roadside receiving sites. This would permit computing a line-of-bearing of the vehicle with respect to the baseline connecting the two receiving sites. Combining the latter two measurements permits position-location of a stranded vehicle.

Figure 5:
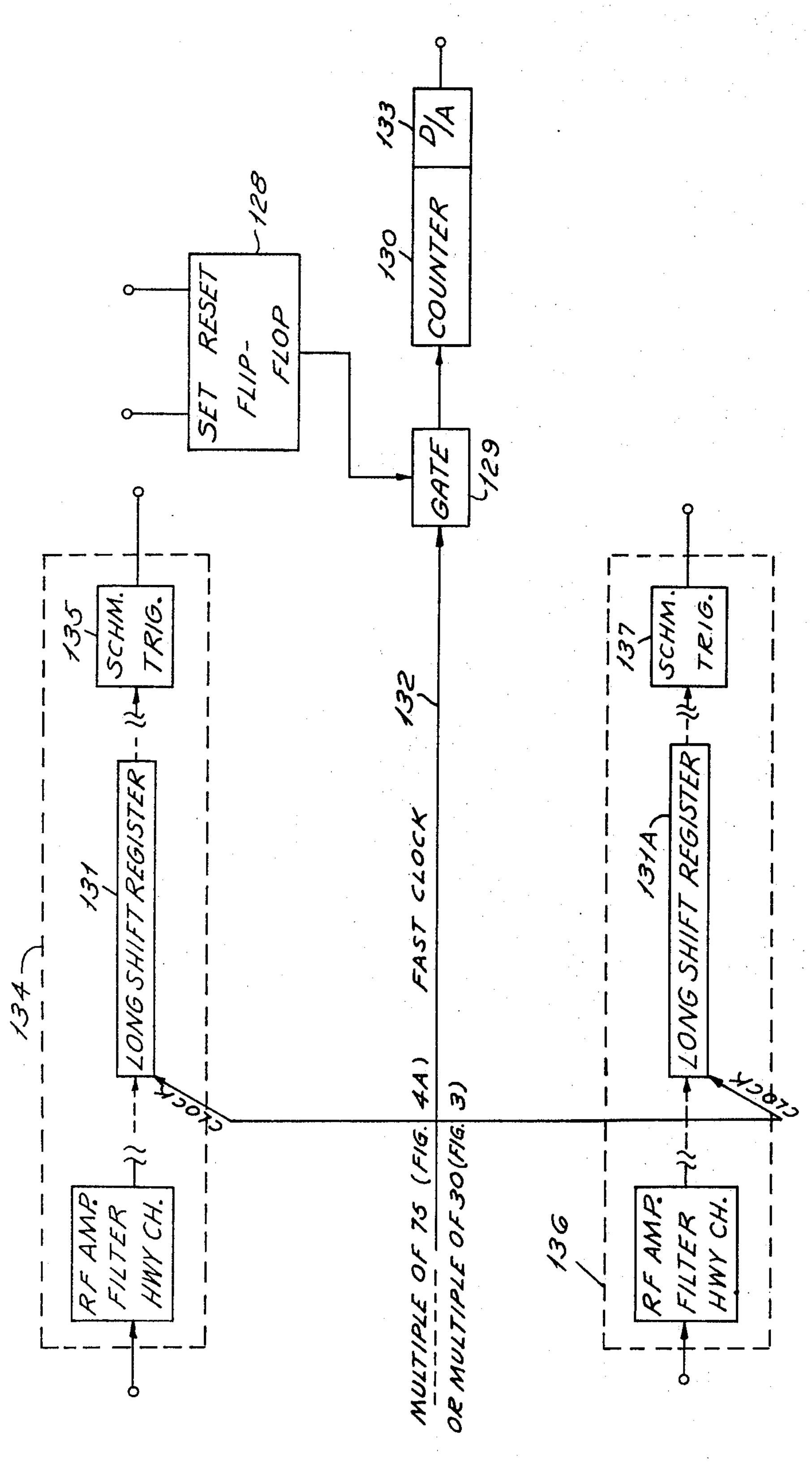
FIG. 5 shows a compressed block diagram version of the receivers for time-interval measurements. The time interval measurements use a longer shift-register and a higher clock rate than the common-function receivers.

FIG. 5 shows two separate receivers 134 and 136 and the logic functions used to make time-interval measurements. One such receiver is included in the vehicle transceiver and major roadside sites will have such a receiver. The receivers 134, 136 which are used for time interval measurement use a longer shift-register 131 than that used for previous functions (74, FIG. 4A). This longer register is required for accuracy of time-interval measurement and results from oversampling by some multiple the binary signal entering the register. This means also that the receiver clock 132 is the same multiple of the clock used for the previous common-functions. The exact multiple depends on the distance (or bearing) accuracy required.

The time interval measurement is similar to the previous measurement of the $\tau$-interval 15 (FIG. 2) used for digital messages or frequency-commands in the common-function mode. In FIG. 5 a set-reset flip-flop 128 controls the gate 129 which controls the entry of clock pulses into the counter 130. The result of counting the high speed clock pulses is converted to a voltage via the digital-to-analog converter 133 and produces a quantized measurement of a time interval. The manner of using the items in FIG. 5 for vehicle spacing control and vehicle position location will be included in the next section.

FIG. 6 illustrates the circuit diagram that is used to implement the baseband matched filter 74, 77, 79 for non-optional functions; for this illustration the sample sequences 1, 5 used in FIG. 1 are used. The shift register 2 has seven stages and the resistors 148 are connected to the proper stages for sequence 1 while the resistors 149 are connected properly for sequence 5. Operational amplifiers 145 and 149 and their feedback resistors 150, 151 serve as the summers for sequences 1 and 5, respectively. The outputs 147 and 152 correspond to the outputs from 79 (FIG. 4A) for two separate non-optional functions.

FIG. 7 shows the electrical connections for the optional function connection matrix 78, again using the illustration of sequences 1 and 5. The requirement here is that a means for switching different shift-register 2 stage connections, corresponding to the two sequences (functions) must be provided. A cross-bar 160, 161 arrangement with diode connections 158, 159 is used. For sequence 1, the second, fifth, sixth, and seventh stages are connected to cross-bar 160 via diodes 158, through resistors 163. The bias battery 162 and resistor 165 serve to bias all diodes off (or open) unless the multiplexer 155 is closed for that particular function. The various controls for 155 are controlled by the holding relays 80A (FIG. 4A). When a given holding relay 80A is active, the corresponding gate in multiplexer 155 closes and turns the diodes 158 on. This connects the proper stages so that the operational amplifier 156 and feedback resistor 157 along with resistors 163 cause output 167 to be the proper sum of the register stage contents for sequence 1.

Sequence 5 is treated similarly using cross-bar 161, diodes 159 and resistors 164. The outputs 167 correspond to the outputs from 80 (FIG. 4A) for two optional functions.

DESCRIPTION OF THE OPERATION

The functions described earlier fall into three categories: (1) Vehicle Receive-Only; (2) Vehicle Response-Transmission; and (3) Vehicle Initiated Transmission. The operation for all functions within a group are similar, so that a description of the group operation describe a set of communication functions.

The following communication functions (listed before) are in the vehicle-receive-only group: (1) traffic warnings, (2) crash warnings, (5) wrong-way entrance prevention, (6) specific traffic advisories, (7) internal siren, (9) halt runaway vehicle, (11) route guidance assist, (12) services available, (14) taped travelogues, (15) vehicle paging.

The transmitter of FIG. 3 transmits repetitive (round-the-clock) unique codeword pairs for each of the functions available at a given transmitter site. All the functions except (2), (7) and (9) use roadside transmitters, and vehicle antennas 113 or 115 are used. The (7) internal siren and (9) halt-vehicle signals come from police or other offical cars, and the 113 vehicle antenna. The crash-warning comes from any victim vehicle.

The transmitter may send either a local area message, using a roadside or a buried antenna, or may send a wide-area message, using an elevated antenna. Full area coverage required by (4) motorist-aid and any wide-area (15) vehicle paging (see later) will require elevated antennas, with spacing and power determined by the coverage desired. Command-transmissions from such wide-area transmitters are time-multiplexed with the local-area command-transmissions.

The vehicle receiver receives one cycle of the repetitive transmitted cycles, using the common-function mode, for any optional function for which a button 79B is pressed. The button can be pressed at any time, and it will remain pressed until the vehicle reaches the area where the information request will be filled. Any nonoptional functions will automatically trigger the receiver when the vehicle comes into range.

The following receive-only functions transmit solely a digital message: (2) crash warning, (5) wrong-way entrance, (6) keying of an internal siren, (9) halt-vehicle, (11) route guidance assist, (14) key taped travelogue, (15) vehicle paging. All except (11) are binary (simple presence) messages.

Some (2) traffic-warnings and (12) service-available may be keyed by digital message, using a vehicle-stored formatted message. Usually, however, (1) traffic warning, (6) specific traffic advisories, and (12) services available will use the voice-modulated extended message 16 mode at a locally clear frequency channel.

Vehicle paging may be done on a local-area basis, or might be done using the same wide-area elevated antennas that are used (once per minute) by the aid-codeword. A separate wide-area channel would be used for wide-area paging so as not to interfere with the local-area common-function mode.

The following functions use vehicle-response-transmissions in addition to the above receive-codeword operation: (4) motorist-aid, (10) vehicle spacing (commanded from rearward vehicle) and (13) automatic tolling. For automatic-tolling, the identify codeword from the roadside transmitter (FIG. 3) causes the unique vehicle identification (binary sequence) stored in 108 to be transmitted via either the 113 or 116 antenna.

For motorist-aid, it is assumed that the Aid codeword-pair is transmitted from elevated wide-area transmitters and from any local area sites (say once per minute) on a highway channel from every location equipped to receive aid calls. The spacing and power of such transmitters would depend on local conditions and coverage attempted. The aid-codeword would be time-multiplexed with any local area command codewords. The vehicle position-location required for motorist aid will be either automatic or will require operator assist.

When a motorist activates his Aid button 79B, the next transmitted Aid codeword-pair will either:

1. Notify that aid is on the way, using a digital indicator 90, if the system has an automatic location capability at that point. Automatic location using some highway channel is possible if the vehicle is on a continuously instrumented roadway (series of repeaters, or a continuous cable) by noting where in the series the signal entered, or by using a line-of-bearing computation from two cooperative receiving sites (see later), or by using distance measurement—with directive antenna. The maximum range for this mode will be determined by the maximum vehicle transmitter power.

2. Frequency-command the vehicle transmitter and power setting for voice description of location (alternatively the operator could punch-in the nearest visible roadside numeral). A locally clear frequency that propagates for the desired range would be used for this mode. This aid-description using voice response can be used by the motorist to report unusual or hazardous incidents.

Vehicle spacing is a dedicated function. A given vehicle can measure distance to a preceding vehicle by using one receiver 134 of FIG. 5 and the counter elements 130. The given vehicle repetitively transmits a request Space codeword stored in 108 (FIG. 4C) through its forward-looking antenna 114 (FIG. 4C). The trailing edge trigger 134A (FIG. 4C) of the cycle generator 121 (FIG. 4C) indicates the end of the transmitted codeword. The trigger 134A sets the flip-flop 128.

The transmitted Space codeword enters the dedicated receiver 125 (FIG. 4C) of the preceding vehicle. The trigger from 127 causes a commanded and timed repeat of the Space codeword from the preceding vehicle using the rearward-facing antenna 116 (FIG. 4C). Thus, the preceding vehicle outputs a transmitted-response.

The given vehicle receives the responded Space codeword in its dedicated receiver 134. When Schmitt trigger 135 triggers, it marks a finely quantized indication of the arrival time of the responded codeword. The Schmitt trigger 135 output Resets the flip-flop 128. The accumulated D/A converted clock count measures the distance between the vehicle and the preceding vehicle.

Since a given vehicle must transmit a respond codeword to the following vehicle and a request codeword to the preceding vehicle, the transmitter is slaved to the respond command (from the rearward vehicle), and transmits the respond codeword on both the rearward and the forward antennas so that the respond transmission simultaneously serves as the request codeword for the preceding vehicle. Vehicle spacing control is accomplished by connecting the counter output 133 to the (external) vehicle speed controls.

The vehicle distance from a roadside transmitter is accomplished using a responded transmission from the vehicle. We now assume that the receiver 134 (FIG. 5) is a (distance) vehicle receiver, and that 136 and the counting circuits are at the roadside receiver. The flip-flop 128 is Set when the trailing edge from one-shot 37 (FIG. 3) indicates the end of the transmitted Distance codeword. The vehicle receiver will reply with a distance codeword if the Aid function push-button has been pressed by the vehicle operator. The trigger 135 output (in the vehicle) causes a responded Distance codeword from 108 (FIG. 4C) to be transmitted. When the responded Distance codeword arrives back at the roadside transceiver, a dedicated receiver 136 is used. A trigger from 137 resets the flip-flop 128. The count accumulated in 130 in a finely quantized measurement of the time between roadside transmission of the Distance codeword, and reception of the vehicle-responded codeword. This permits a classical calculation of distance between roadside transceiver and vehicle, using the velocity of propagation.

The position of a vehicle can be determined by performing the above distance measurement at two roadside transceiver sites and combining the measurements in a classical manner. The resulting solution has two possible location-solutions. Incorporation of some third information measure (one received signal stronger than the other, one solution not on a roadway, or a third reception) would be used to resolve the ambiguity. A procedure equivalent to that just described is to compute the line-of-bearing of the vehicle with respect to the baseline between the two roadside receiving sites.

When using the position-location, the power setting for the vehicle response-transmission would be commanded by the $\tau$-interval between the codewords in the pair and would vary with the coverage of that particular receiving site. Probably a highway channel dedicated to the position-location function is desirable.

The remaining vehicle-initiation functions are: (3) emergency homing signal, and (8) traffic signal control. The homing signal will activate automatically, using a vehicle crash sensor 117. It will be transmitted sequentially from all four antennas 113, 114, 115, 116 to assure propagation for any vehicle configuration.

For traffic signal control, the vehicle will transmit Green-light codewords stored in 108, using a repetitive cycle determined by 121, from antenna 113. Presumably the signal controller would consider a majority vote for determining change of traffic signal.

REVIEW OF THE ADVANTAGES

1. The primary advantage is that this system provides the basis for compatibly accomplishing any present and future desired vehicle communication, paging, or position-location functions.
2. The system automatically provides emergency messages and warnings.
3. Any non-emergency messages are optional and selectable by the vehicle operator, requiring only the simple pushing of a button.
4. Although providing a total range of functions, only a few nationwide channel assignments are needed.
5. The system cost is relatively inexpensive because integrated-circuit digital electronics are used.
6. The number and severity of accidents will be reduced due to the automatic danger and other warnings and positively preventing wrong-way and runaway vehicles.
7. Traffic will be speeded, using specific advice as to avoiding congestion and traffic signal requests.
8. Paging in the vehicle is available.
9. Motorist aid requests from within the vehicle are available.
10. Travelling will be more pleasurable using services information, route guidance and taped travelogues.

Even though the invention has been described herein as applied to various embodiments of a vehicle communication system, it is to be understood that the disclosed message communication system has other applications and that the scope of the invention is defined in the appended claims.

I claim:

1. A method of communicating between a first station and a second station comprising:

a. transmitting from said first station on a single carrier frequency a sequence of a plurality of unique pairs of spaced binary code words,
   1. the code words in each pair being identical,
   2. each code word specifying a unique communication function,
   3. the time interval between the code words in each pair being above or below a predetermined value, b. transmitting from said first station, on a local frequency determined by the length of said time interval, selected messages following code word pairs having time intervals above said predetermined value, code word pairs having time intervals below said predetermined value uniquely specifying a relatively brief message or command, c. receiving at said second station said single carrier frequency with a receiver having a first channel permanently tuned to said single carrier frequency, d. decoding selected pairs of the transmitted code words, e. generating, in response to a decoded selected pair of code words having a time interval below said predetermined value, a first signal for controlling a device, and f. generating, in response to a decoded selected pair of code words having a time interval above said perdetermined value, a second signal dependent on said time interval for automatically tuning a second channel in said receiver to said local frequency to receive said selected messages following code words pairs having time intervals above said predetermined value.

2. A method as defined in claim 1 wherein said binary code words are from the class of linear maximal binary sequences and linear nonmaximal preferred polynomial binary sequences.

3. A vehicle communication system for transmitting messages and commands between at least one central station and one or more of a plurality of mobile stations, comprising:

a. a central radio transmitter including
   1. means for generating a plurality of unique binary code words each specifying a different communication function,
   2. time interval generating means for controlling said code word generating means to generate a repetitive sequence of identical pairs, the time interval between the code words in each pair being above or below a predetermined value,
   3. means for selecting one of said unique binary code words for transmission,
   4. first means for modulating a first carrier frequency signal with the repetitive sequence of pairs of the selected code word,
   5. a source of long duration message signals, and
   6. second means for modulating a second carrier frequency signal with said long duration message signals between the transmission of pairs of the selected code words, b. at least one mobile receiver having a first channel permanently tuned to said first carrier frequency and a second tunable channel, including
   1. first detecting means for detecting when said first carrier frequency signal exceeds a predetermined threshold,
   2. second detecting means controlled by said first detecting means for detecting the modulating binary code word,
   3. decoding means for decoding selected pairs of code words detected by said second detecting means,
   4. means connected to the output of said decoding means for measuring the time interval between each pair of decoded binary code words,
   5. switching matrix means connected to the outputs of said decoding means and said time interval measuring means for generating a first set of output signals if the time interval between code word pairs is below said predetermined value, and a second output signal if the time interval between code word pairs is above said predetermined value,
   6. output means responsive to said first set of output signals for providing message or command outputs, 7. automatic channel tuning means responsive to said second output signal for automatically tuning said second channel to said second carrier frequency to receive said long duration message signal, and 8. means for detecting the cessation of said second carrier frequency signal for retuning said second channel to its original frequency at the end of said long duration message signal.

4. A vehicle communication system as defined in claim 3 further comprising a mobile radio transmitter associated with said mobile receiver and responsive to one of said unique pairs of spaced code words to transmit a message.

5. A communication system as defined in claim 4 further comprising memory means at said mobile receiver for storing a plurality of messages, and means responsive to said first set of output signals for selecting one of said stored messages for transmission.

6. A communication system as defined in claim 4 wherein said message is transmitted on said first carrier frequency.

7. A communication system as defined in claim 6 further comprising additional pairs of associated remote radio receivers and transmitters.

8. A vehicle communication system as defined in claim 4 wherein said message is transmitted on another local frequency determined by the time interval of a detected code word pair, and further comprising a central receiver associated with said central transmitter for receiving the transmitted message on said other local frequency.

9. A vehicle communication system as defined in claim 3 wherein said mobile receiver is located in a vehicle, and further comprising a. a mobile transmitter in said vehicle for transmitting a single code word on another carrier frequency;

b. a remote transponder for receiving and retransmitting said single code word;

c. a third channel in said mobile receiver and tuned to said other carrier frequency for receiving the retransmitted code word; and d. timing means for generating a timing signal indicative of the time interval between the transmission of said single code word and the reception of the said single code word retransmitted by said transponder.

10. A vehicle communication system as defined in claim 9 wherein said first carrier frequency and said other carrier frequency are identical and said transponder is located in another vehicle so that said timing signal is indicative of the spacing between the two vehicles.

11. A vehicle communication system as defined in claim 3 wherein said binary code words are chosen from the class of linear maximal binary sequences and linear non-maximal preferred polynomial sequences and said decoding means comprises a digital matched filter.

12. A vehicle communication system as defined in claim 11 further comprising:

a. a mobile radio transmitter associated with said mobile radio receiver and responsive to a single code word from said central radio transmitter to retransmit said single code word;

b. a central radio receiver associated with said central transmitter for receiving the retransmitted single code word; and c. timing means in said central receiver for measuring the time interval between the transmission of said single code word and the reception of the said retransmitted single code word.

13. A vehicle communication system as defined in claim 3 wherein said central radio transmitter and said mobile receiver are located in different vehicles.

14. A vehicle communication system as defined in claim 3 wherein the messages and commands transmitted between said at least one central station and one or more of a plurality of mobile stations are divided into optional and non-optional categories, said decoding means in said receiver being divided into a plurality of channels designated either as optional or non-optional, said receiver further comprising:

a. optional information request means for activating selected optional channels in said decoding means, and b. automatic reset means responsive to the second of the pair of code words decoded by said decoding means corresponding to a selected optional channel for deactivating that channel.

15. A vehicle communication system as defined in claim 14 wherein said receiver further comprises manual inhibiting means for inhibiting a selected one of said non-optional channels for a predetermined period of time.

16. A vehicle communication system as defined in claim 15 wherein said binary code words are chosen from the class of linear maximal binary sequences and linear non-maximal preferred polynomial sequences and each of said plurality of channels in said decoding means comprises a digital matched filter.

17. A vehicle communication system as defined in claim 3 wherein said source of long duration message signals comprises:

a. storage means for storing said long duration message, and b. means for repetitively reading said long duration message out of said storage means to said second means for modulation under the control of said time interval generating means.

18. In a vehicle communication system for transmitting messages and commands between at least one central station and one or more of a plurality of mobile stations, said communication system including a central radio transmitter having means for generating a plurality of unique binary code words each specifying a different communication function, time interval generating means for controlling said code word generating means to generate a repetitive sequence of identical pairs, the time interval between the code words in each pair being above or below a predetermined value, means for selecting one of said unique binary code words for transmission, first means for modulating a first carrier frequency signal with the repetitive sequence of pairs of the selected code word, a source of long duration message signals, and second means for modulating a second carrier frequency signal with said long duration message signals between the transmission of pairs of the selected code words, a mobile receiver comprising:

a. a first channel permanently tuned to said first carrier frequency and a second tunable channel, b. first detecting means for detecting when said first carrier frequency signal exceeds a predetermined threshold, c. second detecting means controlled by said first detecting means for detecting the modulating binary code word, d. decoding means for decoding selected pairs of code words detected by said second detecting means, e. means connected to the output of said decoding means for measuring the time interval between each pair of decoded binary code words, f. switching matrix means connected to the outputs of said decoding means and said time interval measuring means for generating a first set of output signals if the time interval between code word pairs is below said predetermined value, and a second output signal if the time interval between code word pairs is above said predetermined value, g. output means responsive to said first set of output signals for providing a message or command output, h. automatic channel tuning means responsive to said second output signal for automatically tuning said second channel to said second carrier frequency to receive said long duration message signal, and i. means for detecting the cessation of said second carrier frequency signal for retuning said second channel to its original frequency at the end of said long duration message signal.

* * * * *